March 12, 1935.  R. V. DEVLIN  1,994,304
TRUCK
Filed March 16, 1932

Inventor:
Robert V. Devlin,
by Charles W. Tullar
His Attorney.

Patented Mar. 12, 1935

1,994,304

UNITED STATES PATENT OFFICE 1,994,304

TRUCK

Robert V. Devlin, Erie, Pa., assignor to General Electric Company, a corporation of New York Application March 16, 1932, Serial No. 599,131

5 Claims. (Cl. 105—194)

My invention relates to locomotive or car trucks of the type having springs and equalizers arranged on each side of the truck between the truck frame and axles for evenly distributing the load upon the axles and for distributing and minimizing the shocks received by the truck when passing over irregularities in the track.

An object of my invention is to provide a truck of this type having an improved and simplified arrangement of the springs and equalizers between the truck frame and axles.

A further object of my invention is to provide a truck which can be readily fabricated of structural steel.

My invention will be more fully set forth in the following description referring to the accompanying drawing, and the features of novelty which characterize by invention will be pointed out with particularity in the claims annexed to and forming a part of this specification.

Figure 1:
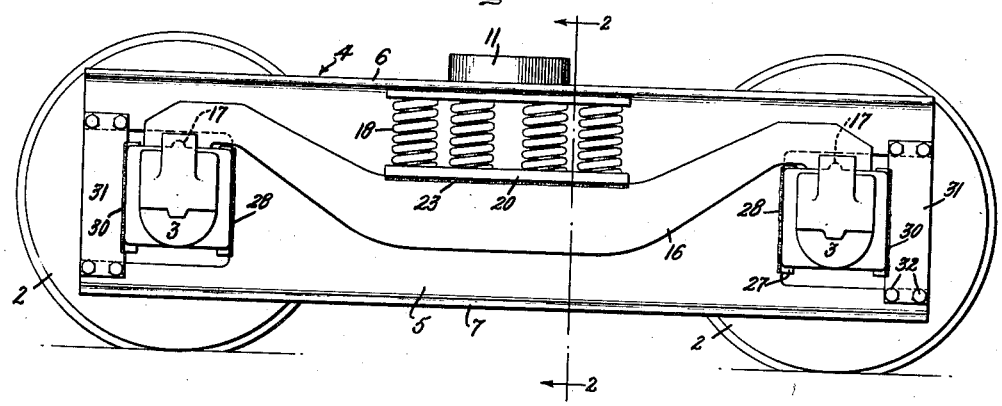
Figure 2:
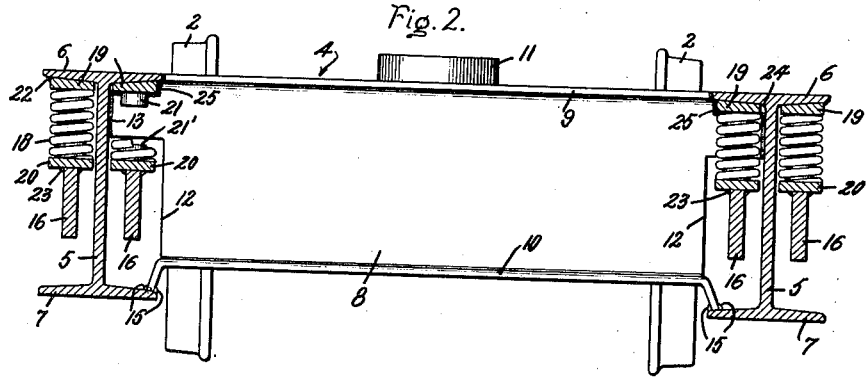
Figure 3:
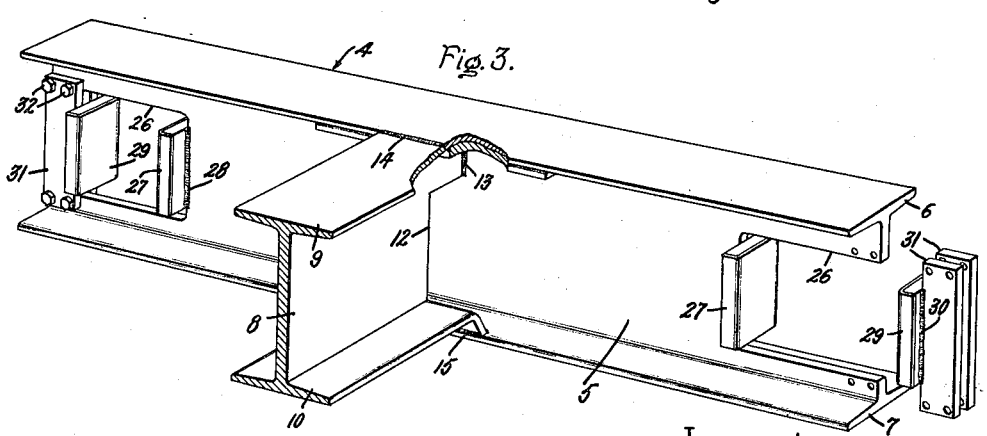

In the drawing, Fig. 1 is a side elevation of a locomotive or car truck embodying my invention; Fig. 2 is a transverse section on line 2—2 of Fig. 1; and Fig. 3 is a perspective view of parts of Figs. 1 and 2 to more clearly illustrate the fabricated construction of the truck frame.

In the drawing, the truck which I have shown embodying my invention includes wheels 2 secured to a pair of spaced axles having journal boxes 3 for supporting a frame 4 of the truck on the axles. The frame 4 is of fabricated construction which is made of I-beams, or other suitable rolled structural shapes, and comprises side frames 5 having upper and lower flanges 6 and 7. The side frames 5 are connected together by a transom 8 having upper and lower flanges 9 and 10, the upper flange 9 having secured thereto a center plate 11 for supporting the body of a locomotive or car. In order to obtain adequate clearance of the truck and at the same time reinforce the truck frame, the transom 8 is made of less depth than the side frames 5, the ends of the web of the transom are cut away at 12, and the ends of the lower flange 10 of the transom are bent downwardly, so that the transom will be supported at the lower flange 10 thereof by the lower flanges 7 of the side frames, as shown in Figs 2 and 3. The side frames 5 are secured to the transom 8 by welding the webs thereof together at 13, welding the upper flanges 6 and 9 together at 14, and welding the lower flanges 7 and 10 together at 15.

In this construction load on the truck is evenly distributed to the axles by equalizers 16 which extend longitudinally of the frame 4 and beneath the upper flanges 6 on each side of the side frames 5, the equalizers on the inner sides of the side frames extending through the notches 12 in the transom 8. The equalizers 16 are supported on top of the journal boxes 3, and longitudinal movement thereof is prevented by providing recesses therein which engage projections on the journal boxes, as shown at 17 in Fig. 1. Load is transmitted from the truck frame 4 to the equalizers 16 through coil springs 18 arranged on each side of the side frames 5 intermediate the journal boxes 3, and interposed between the equalizers 16 and the upper flanges 6 of the side frames. In order to provide flat bearing surfaces for the springs 18, plates 19 and 20 having projections 21 and 21' for receiving the springs are welded to the upper flanges 6 and equalizers 16 at 22 and 23 respectively, the plates 19 being secured to the upper flanges 6 on the inner side of the side frames 5 extending through notches 24 in the transom 8, and welded thereto at 25.

In order to facilitate removal of the wheels 1 and axles from the frame 4, the journal boxes 3 are arranged in slots 26 formed at the ends of the webs of the side frames 5. The inner pedestal jaws for the journal boxes 3 comprise plates 27 welded to the side frames at 28, and the outer removable pedestal jaws comprise plates 29 welded at 30 to a pair of spaced parallel cross plates 31, which are bolted at 32 across the ends of the slots 26. In this manner inspection or repairing of the truck is easily effected by removing the outer pedestal jaws, and rolling the wheels and axles endwise from the truck frame.

It will thus be apparent that I have provided a truck having a simplified arrangement of springs and equalizers for evenly distributing the load upon the axles. By providing flanged side frames, and interposing springs between the flanges and equalizers, which extend longitudinally of the truck beneath the flanges, a minimum number of parts are required in the construction of the truck. Moreover, the side frames and transom may be made of standard I-beams, or other suitable rolled structural shapes, and the equalizers may be cut from flat metal stock, so as to provide a fabricated truck construction, which is inexpensive to manufacture.

What I claim as new and desire to secure by Letters Patent of the United States, is:—

1. A truck including wheels and axles, a unitary truck frame comprising a transom having notches at the ends thereof and flanged side frames provided with pedestal jaws, said axles having journal boxes arranged in said pedestal jaws, equalizers extending beneath the flanges of said side frames on each side thereof and supported on said journal boxes, said equalizers on the inner sides of said side frames extending through the notches in said transom, and means including springs interposed between the flanges of said side frames and said equalizers for supporting said truck frame on said equalizers.

2. A truck including wheels and axles, a unitary truck frame comprising a transom and I-shaped side frames having upper and lower flanges and webs slotted at the ends thereof, said axles having journal boxes arranged in said slots and adapted to be removed endwise from said side frames, equalizers extending longitudinally of said side frames between the upper and lower flanges thereof and supported on said journal boxes, and means including springs interposed between said equalizers and the upper flanges of said side frames for transmitting load from said flanges to said equalizers.

3. A truck including wheels and axles, a unitary truck frame comprising I-shaped side frames having upper and lower flanges and provided with pedestal jaws and an I-shaped transom having upper and lower flanges and a web notched at the ends thereof, the transom being of less depth than said side frames and having the ends of the lower flange thereof bent downwardly and attached to the lower flanges of said side frames, said axles having journal boxes arranged in said pedestal jaws, equalizers extending between the upper and lower flanges of said side frames on each side thereof and supported on said journal boxes, and means including springs arranged between said journal boxes and interposed between said equalizers and the upper flanges of said side frames for supporting said truck frame on said equalizers.

4. A side frame for trucks comprising an I-shaped beam having a web and upper and lower flanges and provided with pedestal jaws, journal boxes arranged in said pedestal jaws, equalizers extending between said upper and lower flanges on each side of said web and supported on said journal boxes, and means including springs arranged between said journal boxes and interposed between said equalizers and said upper flanges for transmitting load from the upper flanges of said side frames to said equalizers.

5. A side frame for trucks comprising an I-shaped beam having upper and lower flanges and a web slotted at each end thereof, journal boxes arranged in said slots, an equalizer extending longitudinally of said beam between said flanges and supported on said journal boxes, and means including a plurality of coil springs arranged between said journal boxes and interposed between said upper flange and said equalizer for transmitting load from the upper flanges on said side frame to said equalizer.

ROBERT V. DEVLIN.